(12) United States Patent
 Smith (10) Patent No.: US 9,964,745 B2
(45) Date of Patent: May 8, 2018

(54) COMPACT LASER RADAR CORNER CUBE

(71) Applicant: Nikon Corporation, Tokyo (JP)

(72) Inventor: Daniel G. Smith, Tucson, AZ (US)

(73) Assignee: Nikon Corporation, Tokyo (JP)

( * ) Notice: Subject to any disclaimer, the term of this patent is extended or adjusted under 35 U.S.C. 154(b) by 857 days.

(21) Appl. No.: 13/830,169

(22) Filed: Mar. 14, 2013

(65) Prior Publication Data

US 2014/0063481 A1    Mar. 6, 2014

Related U.S. Application Data

(60) Provisional application No. 61/695,982, filed on Aug. 31, 2012.

(51) Int. Cl.
| | |
|---|---|
| *G01C 3/08* | (2006.01) |
| *G02B 17/08* | (2006.01) |
| *G01B 11/14* | (2006.01) |
| *G02B 27/28* | (2006.01) |
| *G01S 17/08* | (2006.01) |
| *G01S 7/481* | (2006.01) |

(52) U.S. Cl.
CPC .......... *G02B 17/0876* (2013.01); *G01B 11/14* (2013.01); *G01S 7/4814* (2013.01); *G01S 17/08* (2013.01); *G02B 27/283* (2013.01)

(58) Field of Classification Search
CPC .................................................. G02B 17/0876
See application file for complete search history.

(56) References Cited

U.S. PATENT DOCUMENTS

| | | | | |
|---|---|---|---|---|
| 4,772,121 A * | 9/1988 | Trageser | ................. | 356/139.05 |
| 4,824,251 A * | 4/1989 | Slotwinski et al. | .......... | 356/477 |
| 4,941,773 A * | 7/1990 | Vergouw | ....................... | 405/157 |
| 8,098,548 B2 * | 1/2012 | Mikami et al. | ............ | 369/44.23 |
| 2010/0182663 A1 * | 7/2010 | Yamakawa et al. | ............ | 359/11 |
| 2012/0154785 A1 * | 6/2012 | Gilliland et al. | ............ | 356/5.01 |
| 2013/0099957 A1 * | 4/2013 | Goodwin | ............. | G01S 7/4812 342/54 |

* cited by examiner

*Primary Examiner* — Samantha K Abraham
(74) *Attorney, Agent, or Firm* — Klarquist Sparkman, LLP (57) ABSTRACT

Focus assemblies for laser radar are situated to receive a measurement beam that is focused at or in the focus assemblies. In some examples, focus assemblies include a corner cube and a return reflector, and the measurement beam is focused on, at, or within the corner cube or return reflector. A polarizing beam splitter and a quarter wave plate can be situated so that an input measurement beam and an output measurement beam can be separated.

35 Claims, 10 Drawing Sheets

COMPACT LASER RADAR CORNER CUBE

CROSS REFERENCE TO RELATED APPLICATION

This application claims the benefit of U.S. Provisional Application 61/695,982, filed Aug. 31, 2012, which is incorporated herein by reference.

FIELD

The disclosure pertains to focus assemblies for laser radar.

BACKGROUND

In some laser radar systems, a translation of a corner cube is used to focus a measurement beam at various target distances. A corner cube can be advantageous because its performance is not strongly impacted by corner cube tilts, and corner cube surfaces are rigidly fixed so that reflection directions are unlikely to change due to changes in the corner cube. Unfortunately, corner cubes are relatively heavy, expensive, and occupy a considerable volume, and focusing systems that do not require larger corner cubes would be preferred.

SUMMARY

According to representative examples, apparatus comprise a relay optical element configured to focus a measurement light flux along an axis. A beam splitter is configured to direct at least a portion of the measurement light flux to a focusing assembly that includes at least one translatable optical element, such that a propagation distance of the measurement light flux along the axis is variable. The focusing assembly is situated so that the relay optical element focuses the measurement light flux within the focusing assembly. In typical examples, the focusing assembly includes a corner cube. In other examples, the beam splitter is a polarizing beam splitter and a quarter wave plate situated so that an input measurement light flux in a first state of polarization is delivered by the focusing assembly in a second state of polarization that is orthogonal to the first state of polarization. In further embodiments, the polarizing beam splitter is configured to reflect the input measurement light flux to the corner cube. In further representative examples, the polarizing beam splitter is configured to transmit the input measurement light flux to the corner cube.

Methods comprise focusing a measurement beam into a corner cube and adjusting a focus of the measurement beam at a target based on a translation of the corner cube. In some examples, an input measurement beam to the corner cube and an output measurement beam from the corner cube are separated based on a state of polarization of the measurement beam. In further examples, the separating is performed with polarizing beam splitter and a quarter wave plate.

In some examples, optical systems comprise a relay optical system configured to direct a measurement light flux propagating along an axis toward a focus, a focus adjustment system includes at least one optical element that is translatable along the axis, and an objective lens system. A beam splitting system is configured to direct at least a portion of the measurement light flux to the focus adjustment system and at least a portion of the measurement light flux from the focus adjustment system to the objective lens system. The focus adjustment system is configured so that a propagation distance of the measurement light flux between the relay optical system and the objective lens system along the axis is variable so that the relay optical system and the objective lens system focus the measurement light flux at a target. In some embodiments, the focus adjustment system includes a corner cube and a return reflector, wherein the corner cube is translatable along the axis. In some examples, the beam splitting system includes a polarizing beam splitter (PBS) and at least one wave plate situated so that the measurement light flux is delivered to the PBS in a first state of polarization and received by the PBS from the focus adjustment system in a second state of polarization that is orthogonal to the first state of polarization. In typical examples, the at least one wave plate is a ¼ wave retarder that is situated along the axis between the PBS and the corner cube or between the return reflector and the corner cube. According to some examples, the at least one wave plate includes a first wave plate situated between the PBS and the corner cube along the axis, and a second wave plate situated along the axis between the corner cube and the return reflector, and providing a combined ¼ wave retardation. In some embodiments, the PBS is configured to reflect the measurement light flux to the corner cube or to transmit the measurement light flux to the corner cube. In other representative examples, the relay optical system includes at least one lens situated to direct the measurement flux into the PBS. According to other examples, the relay optical system includes at least one lens situated to receive the measurement flux from the PBS and converge the measurement flux into the focus adjustment system.

According to some embodiments, the relay optical system includes a lens situated along the axis between the corner cube and the return reflector. In some cases, the return reflector is convex or concave. In other examples, the relay optical system is configured to direct the measurement light flux propagating along the axis so that the focus is within the focus adjustment system such as within the corner cube or between the corner cube and the return reflector. In some alternatives, the relay optical system is configured to establish the focus along the axis on a target-side optical path in the corner cube associated with propagation of the measurement beam from the return reflector. In some examples, the focus is at a free space portion of the optical path or the focus is situated between the objective lens system and the beam splitting system.

Laser radar systems comprise at least one laser and an optical fiber coupled to the at least one laser and configured to emit a measurement beam from the laser along an axis. A relay optical system is configured to direct the measurement beam along the axis. An objective lens is situated so as to receive the measurement beam from a focusing assembly and a beam splitting optical assembly and direct a focused measurement beam to a target. The focusing assembly includes at least one translatable optical element so as to vary an optical path of the measurement beam along the axis. In typical examples, the relay optical system is situated to direct the measurement beam to the beam splitting optical system or to receive the measurement beam from the beam splitting optical system. According to some examples, the relay optical system is configured to converge the measurement beam or to focus the measurement beam within the focusing assembly. In some examples, the relay optical system is configured to focus the measurement beam along a target-side half of the variable optical path. In further examples, a detection system is configured to receive the measurement beam from the target with the optical fiber and produce an estimate of a target distance. In additional examples, the focusing assembly includes a retroreflector and a return reflector, wherein the retroreflector is translatable to establish the variable optical path. In some examples, the return reflector is fixed.

In a particular embodiment, the retroflector is a corner cube and the optical fiber is a polarization retaining optical fiber configured to emit the measurement beam in a first state of polarization (SOP). The beam splitting optical assembly includes a polarizing beam splitter (PBS) and at least one wave plate situated along the axis and configured to substantially communicate the measurement beam in the first SOP to the focusing assembly and communicate the measurement beam from the focusing assembly to the PBS in a second SOP that is orthogonal to the first SOP. In some alternatives, the PBS is configured to communicate the measurement beam to the focusing assembly by transmitting or reflecting the measurement beam. In other examples, the at least one wave plate is a quarter wave plate or two wave plates that provide a total of ¼ retardation.

Methods comprise receiving a measurement beam to be directed to a target and processing the received measurement beam so as to decrease a divergence of the measurement beam. A propagation length of the decreased divergence measurement beam is varied, and the measurement beam is directed from the variable propagation length to an objective lens. The measurement beam is focused at the target by varying the propagation length. In some examples, the propagation length is varied by translating a retro-reflector. In other examples, the received measurement beam is separated from the decreased divergence measurement beam based on a state of polarization of the received measurement beam or the reduced divergence measurement beam. According to some examples, the divergence of the measurement beam is decreased so as to focus prior to being received at the objective lens.

The foregoing and other objects, features, and advantages of the disclosure will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience in the following description, the terms "light," "optical radiation," "beams," or "optical beams" refer to propagating electromagnetic radiation that can be directed to or from one or more targets to be profiled so as to incident to detectors, optical components and assemblies such as beam splitters, lenses, mirrors, and targets. Radiation can be referred to as propagating in one or more "beams" that typically are based on optical radiation produced by a laser. In addition, such beams can have a spatial extent associated with one or more laser transverse modes, and can be substantially collimated or focused. As used herein, a collimated laser beam is a beam having a Rayleigh range that is as large as or longer than an associated propagation distance.

For convenience, beams are described as propagating along one or more axes. Such axes generally are based on one or more line segments so that an axis can include a number of non-collinear segments as the axis is bent or folded or otherwise responsive to mirrors, prisms, lenses, and other optical elements. The term "lens" is used herein to refer to a single refractive optical element (a singlet) or a compound lens that includes one or more singlets, doublets, or other elements. In some examples, beams are shaped or directed by refractive optical elements, but in other examples, reflective optical elements such as mirrors are used, or combinations of refractive and reflective elements are used. Such optical systems can be referred to as dioptric, catoptric, and catadioptric, respectively. Other types of refractive, reflective, diffractive, holographic and other optical elements can be used as may be convenient. In typical examples, the systems disclosed below are implement using optical radiation at wavelengths between about 200 nm and 2 µm, but other wavelengths can be selected as may be convenient. In many examples, an interrogation beam at a wavelength that is not visible is combined with a visible wavelength beam to permit users to determine beam location visually, without specialized infrared or ultraviolet viewing apparatus.

In some examples, the locations of one or more optical components, assemblies, or systems is referred to as being "between" other such optical components, assemblies, or systems with respect to beam propagation along an axis. In addition, optical beams can be attenuated in optical elements, reflected at optical element surfaces, or divided into two or more distinct beams by beam splitters. For convenient description, a beam exiting a particular optical element or surface can be referred to as an exit beam, a portion of an incident beam, or can continue to be referred to in the same manner as the incident beam. For example, a measurement beam as transmitted by an optical element can be referred to as the measurement beam or a portion of the measurement beam. As used herein, such references to "between" or "adjacent" generally indicate location along an optical system axis and as an optical beam propagates from element to element or surface to surface. Some examples below are described with reference to a measurement beam that is directed to a target. Typically, portions of such a beam are returned through the same optical systems.

Example 1. Beam Splitter with Fiber Aperture

Figure 1:
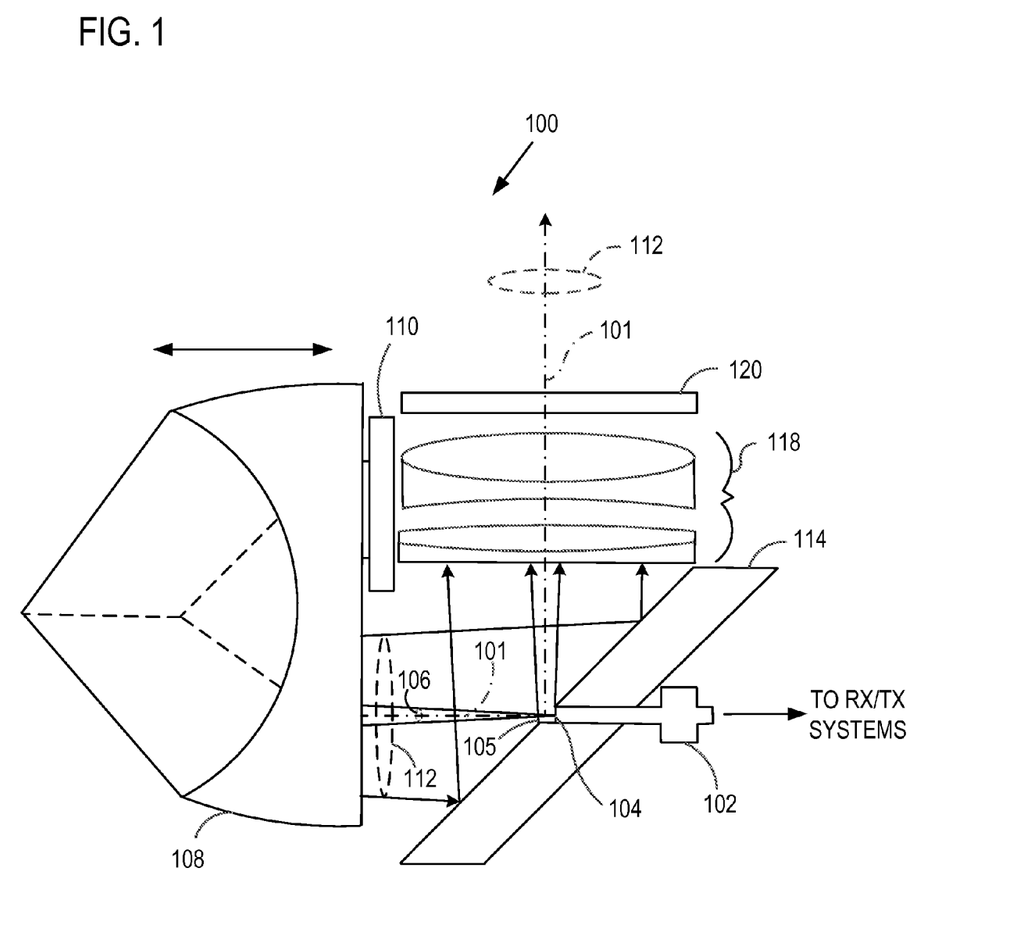
FIG. 1 illustrates a beam focus arrangement in which a fiber end is situated in or at an aperture in a beam splitter.

In some laser radar systems as shown in FIG. 1, an optical system 100 is configured so that a measurement optical beam 106 (and a visible alignment beam) is received via a surface 104 of an optical fiber assembly 102. The optical fiber assembly 102, for example, a connectorized polarization retaining single mode fiber, is situated in or at an aperture 105 defined in a fold mirror 114. The optical fiber assembly 102 is coupled to laser radar receiver (RX) and transmitter systems (TX) that are not shown in FIG. 1. The measurement beam 106 is directed along an axis 101 into a corner cube 108 and returned into the corner cube 108 by a return mirror 110. An objective lens 118 is situated along the axis 101 and receives the measurement optical beam as returned from the return reflector 110 and forms a probe beam 112 that is directed along the axis 101 to a target. The corner cube 108 is generally translatable along the axis 101 and the return reflector 110 fixed. Focusing the probe beam 112 at various target distances is achieved based on translations of the corner cube 108. The configuration of FIG. 1 can require a relatively large corner cube and fold mirror to accommodate the measurement beam diameter.

Example 2. Relayed Image in Focus Adjustment Assembly

Figure 2:
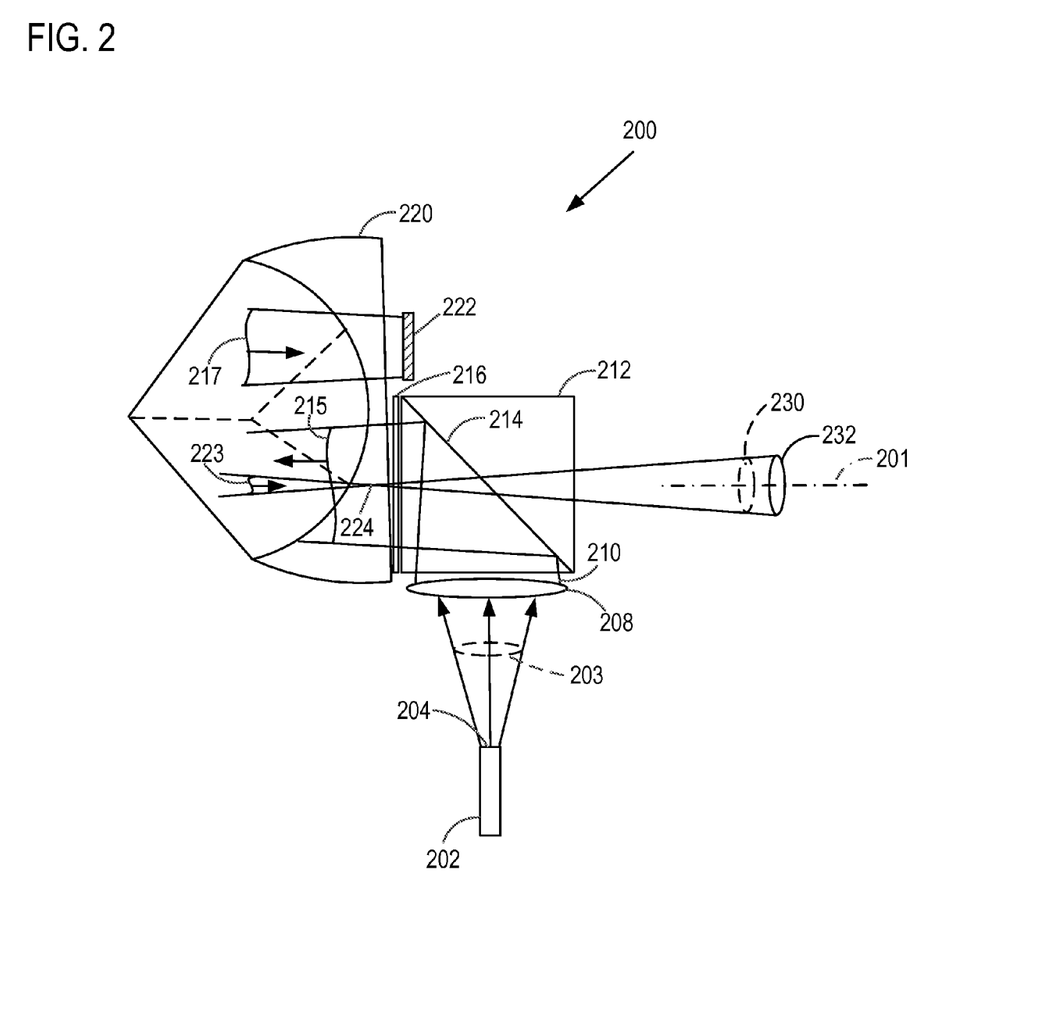
FIG. 2 illustrates a beam focus arrangement in which a fiber end is imaged into or on a beam splitter or corner cube.

With reference to FIG. 2, an optical fiber 202 is situated to direct a measurement beam 203 from a fiber surface 204 (and/or an alignment beam) to a relay lens 208 that is configured to image the fiber surface 204 into or through a beam splitter 212 and/or a corner cube 220. The beam splitter 212 includes a reflective surface 214 that directs a focused measurement beam 210 to the corner cube 220, and a return mirror 222 reflects the measurement beam into the corner cube 220 to the beam splitter 212. As shown in FIG. 2, the measurement beam is shown as a converging measurement beam 217 as incident to the return reflector 222, and as a focused measurement beam 223 that is focused along the axis 201 at a focus 224. The beam splitter 212 then transmits the diverging measurement beam from the focus 224 (at least a portion thereof) to an objective lens 232 as a probe beam 230. While a non-polarizing beam splitter can be used as the beam splitter 212, portions of the measurement beam would be lost in each pass through the beam splitter. More efficient use of a measurement flux can be realized with a polarizing beam splitter (PBS). If the beam splitter 212 is a PBS, the optical fiber 202 is configured to direct a polarized measurement beam to the beam splitter 212 in an initial SOP. While SOPs other than linear can be used, optical components such as polarizing beam splitters are generally more readily available and of simpler construction for linear SOPs than other SOPs, and the optical fiber 202 is typically configured to provide a measurement beam in a linear SOP. The beam splitter 212 and the SOP of the measurement beam are selected so that substantially all of the measurement beam is reflected towards the corner cube 220. A quarter wave plate (QWP) 216 is situated along the axis 201 to receive the polarized measurement beam. The QWP has an axis at 45 degrees with respect to a measurement beam linear state of polarization (SOP) so to produce a circular SOP. The measurement beam is then transmitted by the QWP 216 to the beam splitter 212 after reflection by the return mirror 222. The QWP 216 then produces a measurement beam linear SOP that is rotated by 90 degrees with respect to the input SOP. Thus, if the beam splitter 212 is configured to reflect the SOP associated with the input measurement beam, the beam splitter 212 will also be configured to transmit the returned beam, and the beam splitter 212 need not introduce significant measurement beam power loss.

The relay lens 208 images the fiber output surface 204 on or near surfaces of the corner cube 220, the beam splitter 212, or other optical elements. This can be undesirable as any dust particles that happen to be at a focus location can seriously degrade transmitted power, so such surfaces have to be kept clean, or some provision should be made to clean them. Second, partial reflections from such surfaces can produce an image of the fiber surface 204 back at the fiber surface 204. This effect can be mitigated with anti-reflection (AR) coatings, by tilting surfaces so that returned light is incident to the fiber outside of the acceptance angle of the fiber (tilt of about half the fiber NA is typically sufficient), or by providing a PBS with a high extinction ratio. AR coatings and tilts are generally convenient. The corner cube 220 and the return reflector 220 form a focusing assembly; typically the corner cube 220 is translatable along the axis 201.

Figure 3A:
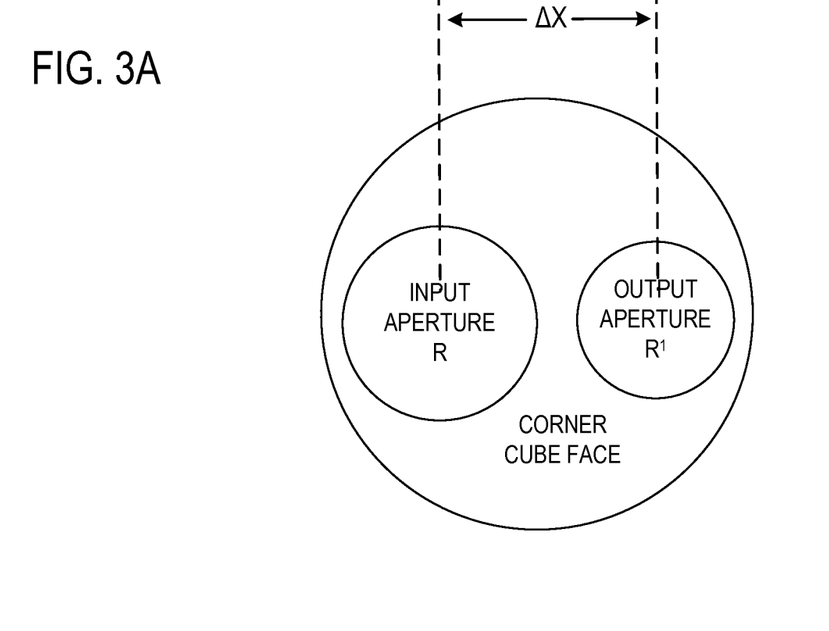
FIGS. 3A-3B illustrates beam intersections with an input/output face of a corner cube and an associated ray trace.
Figure 3B:
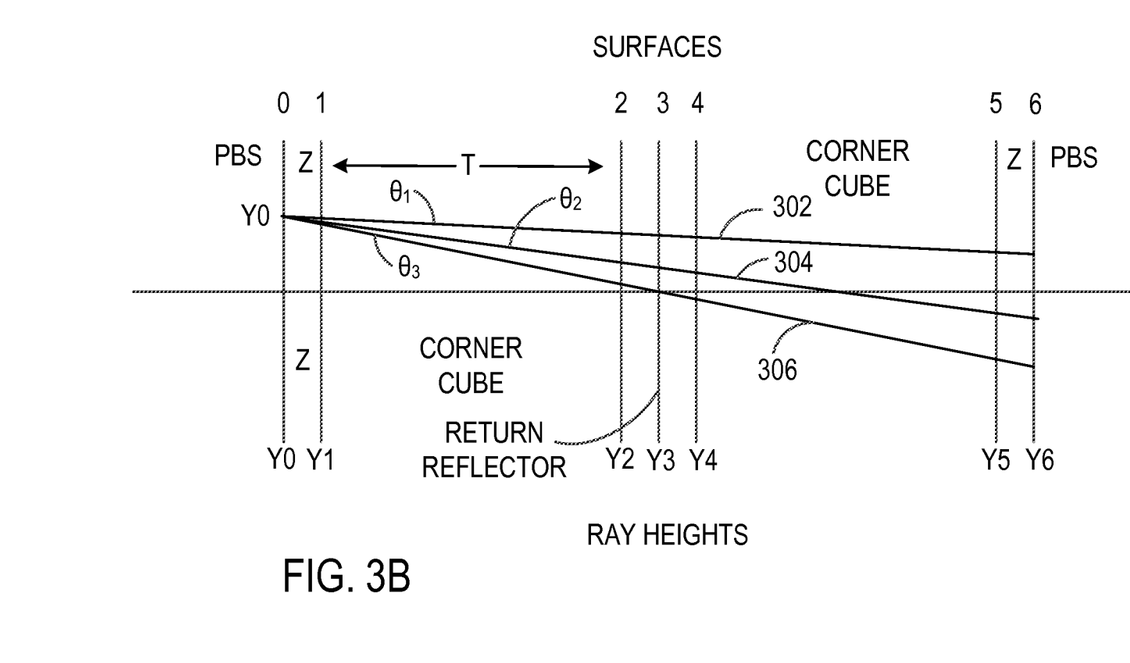

The FIG. 2 system can be readily implemented and surface areas and dimensions determined by ray tracing. In typical examples, smaller corner cubes are preferred. FIG. 3A illustrates input and output beam diameters at an input/output face of a corner cube such as that of FIG. 2 and FIG. 3B illustrates a representative ray trace based on surface descriptions in the following table. For a given NA, an input beam size can be selected to minimize or reduce corner cube diameter based on tracing a single edge ray through the optical surfaces. Variables YI are ray heights at the surfaces, wherein I=1, . . . , 6. T is total (one way) path length in the corner cube, and Z is corner cube/return reflector separation.

For convenience, PBS/corner cube separation assumed to be the same as corner cube/return reflector separation, and the index of refraction is assumed to be constant. In typical examples, an air gap separates the return reflector and the corner cube, and this gap can be accommodated by changing ray angles at surfaces 2 and 4. In addition, the PBS/corner cube gap is assumed filled with a wave plate of a common refractive index. Different refractive indices can be readily accommodated, if desired, and the return reflector and the beam splitter need not be equally spaced from the corner cube.

| SURFACE NO. | DESCRIPTION | PATH LENGTH |
| --- | --- | --- |
| 0 | PBS | Z |
| 1 | CORNER CUBE | T |
| 2 | CORNER CUBE | Z |
| 3 | RETURN REFL. | Z |
| 4 | CORNER CUBE | T |
| 5 | CORNER CUBE | Z |
| 6 | PBS | |

FIG. 3B illustrates ray traces for representative rays 302, 304, 306 having associated convergence angles $\theta_1$, $\theta_2$, $\theta_3$, respectively. The convergence angles can be determined based on a numerical aperture of the fiber 202 and the position and focal length of the relay lens 208. Ray 302 is associated with a converging beam that is directed to a focus outside of the corner cube/return reflector assembly. Ray 304 corresponds to FIG. 2, and is associated with a focus near the exit of the measurement beam from the corner cube. Ray 306 is directed to a focus at the return reflector, for which beam diameters of input and output beams are the same. Any beam focus between surfaces 0 and 3 would result in an exit beam that is larger than the input beam. In general, at the beam splitter side of the corner cube, beam radius R is the greater of Y1 and |Y5|; at the return reflector side of the corner cube, beam radius R' is the greater of |Y2| and |Y4|. For a beam displacement ΔX at the corner cube, a minimum beam diameter $D_{MIN}$ is twice the greater of ΔX+R and ΔX+W. Ray traces and diameters can be determined for other configurations as well in a similar fashion.

Example 3. Plate Beam Splitter

Figure 4:
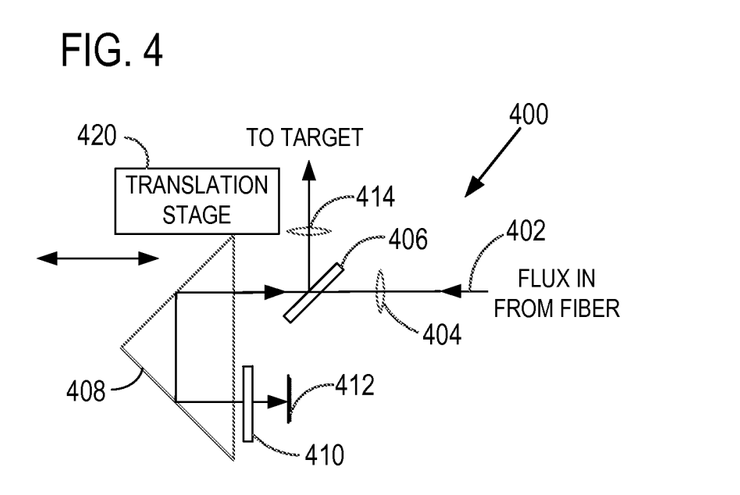
FIG. 4 illustrates a beam focus arrangement using a beam splitter and a quarter wave plate, wherein the measurement beam is focused at or near a return mirror.

With reference to FIG. 4, an optical system 400 directs an input optical beam 402 from, for example, an optical fiber, to a to a relay lens 404 that images the fiber end or otherwise converges or collimates the optical beam into, on, or through a plate beam splitter 406, a retroreflector 408 such as a corner cube, a wave plate 410 such as a quarter wave plate (QWP), a return mirror 412, or the beam splitter 406. Typically, an image of a fiber end surface is situated between surfaces of optical elements so as to avoid the effects of dust particles and other surface contamination. For convenience in illustration, FIG. 4 shows a right angle prism retroreflector instead of a corner cube, but such a prism or sets of mirrors or other reflective surfaces configured as such prisms or as corner cubes can be used. The retroreflector 408 is translatable with a translation stage 420 to focus a measurement beam at a target with an objective lens 414.

Example 4. Relayed Image with QWP at Return Reflector

Figure 5:
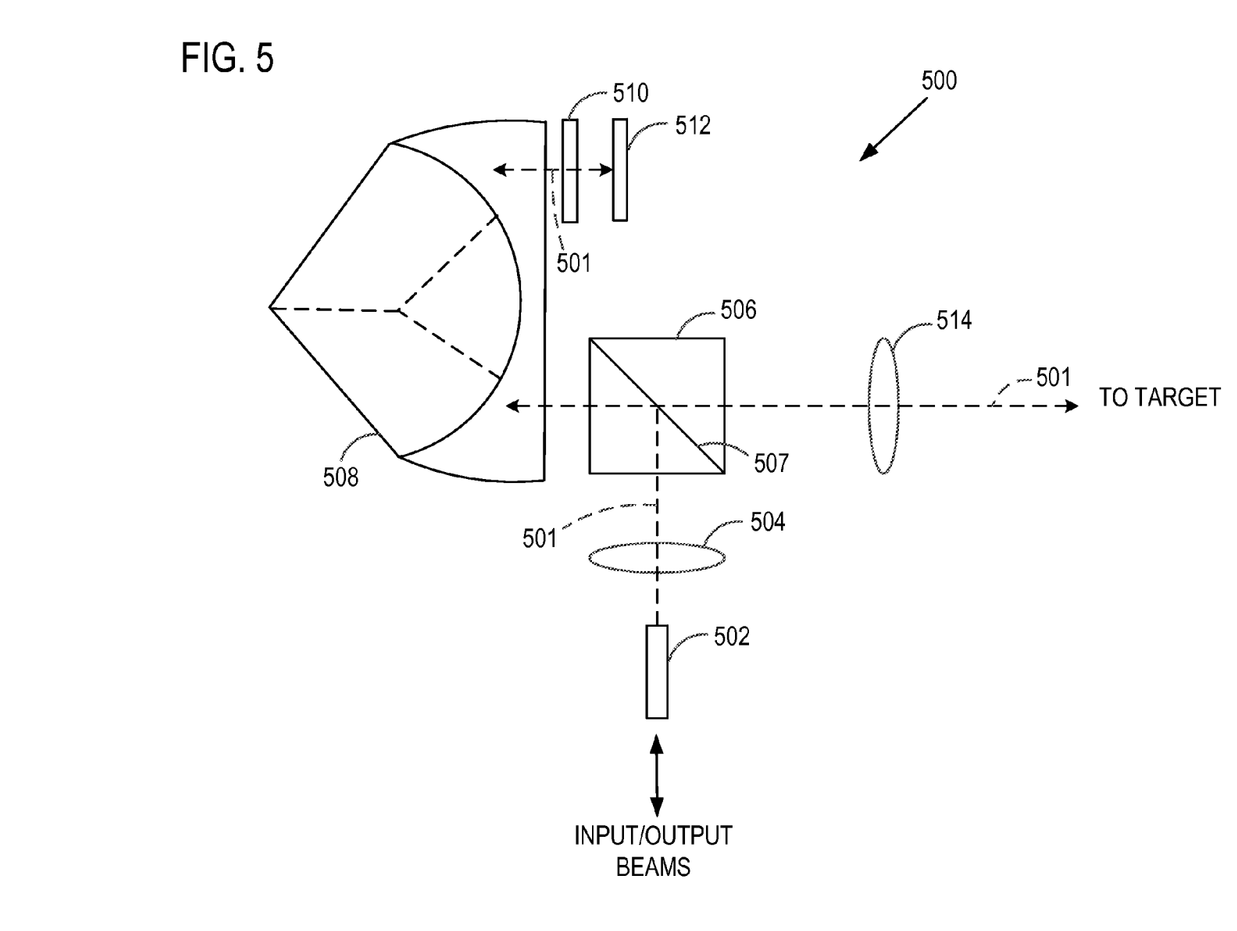
FIG. 5 illustrates an optical system for a laser radar that includes a wave plate situated at a return reflector in a focusing assembly.

Referring to FIG. 5, a laser radar optical system 500 includes an optical fiber 502 configured to direct a measurement beam along an axis 501 to a PBS 506 through a relay lens 504. The measurement beam is configured to be an s-polarized beam with respect to a reflective surface 507 of the PBS 506 so that the measurement beam is efficiently reflected to a corner cube 508. The corner cube 508 communicates the measurement beam to a quarter wave plate 510 and to a return reflector 512. The measurement beam is reflected by the return reflector 512 and is incident to the PBS 506 in a p-polarization that is efficiently transmitted by the PBS 506. An objective lens 514 focuses the measurement beam at a target, based on translating the corner cube 508 along the axis 501.

Example 5. Relayed Image with Transmitted Input Beam

Figure 6:
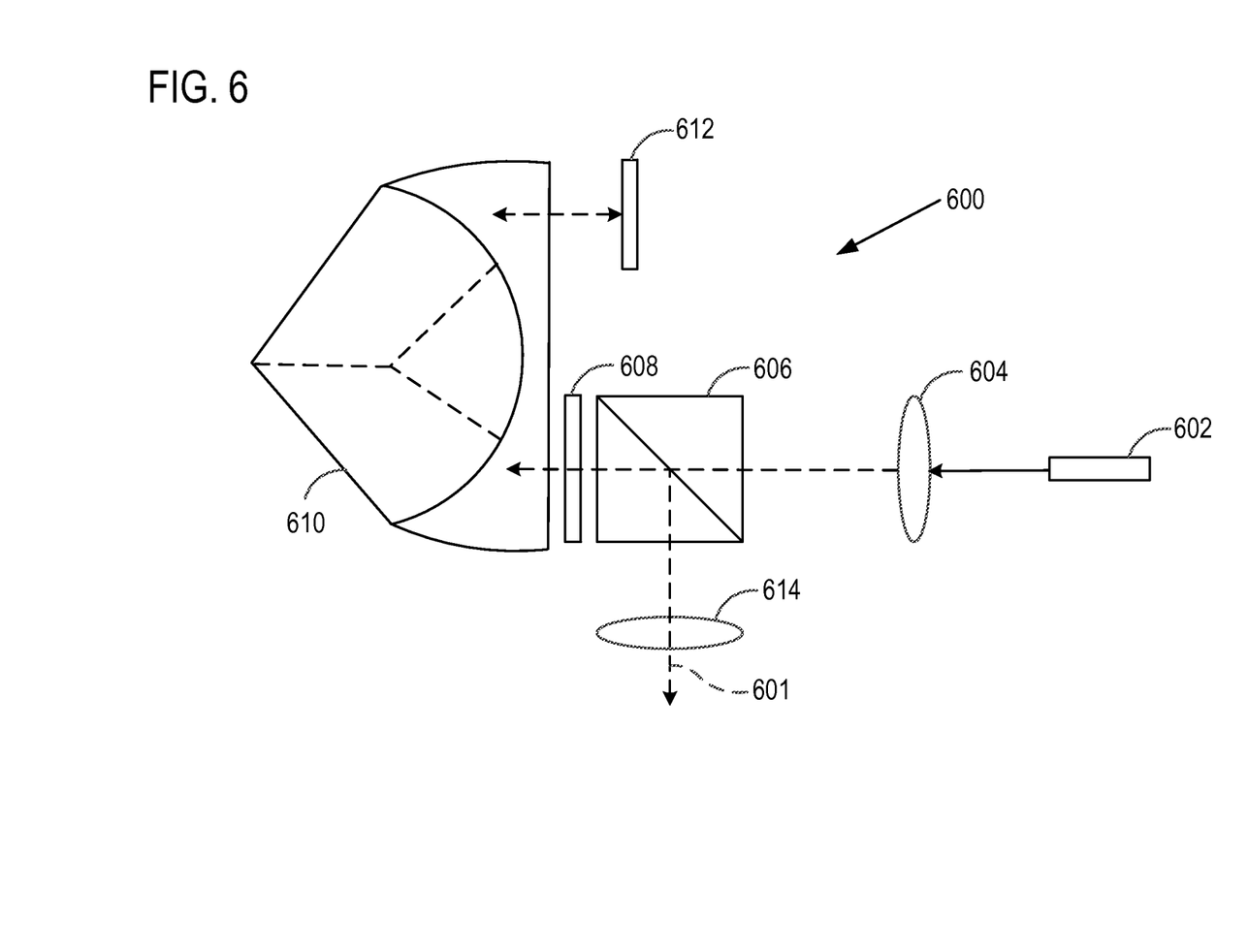
FIG. 6 illustrates an optical system in which a measurement beam is reflected to a target by a beam splitter.

With reference to FIG. 6, a laser radar optical system 600 includes an optical fiber 602 that is situated to direct a measurement beam along an axis 601 to a PBS 606 through a relay lens 604. The relay lens 604 is configured to collimate or converge the measurement beam from the fiber 602 to a focus that is situated along the axis 601, and is typically along the optical patch between a QWP 608 and an objective lens 614. An SOP of the measurement beam is selected to permit efficient transmission by the PBS 606 to the QWP 608. A corner cube 610 and a return reflector 612 receive the measurement beam and return the measurement beam to the QWP 608 and the PBS 606. After transmission of the returning measurement beam by the QWP 608, the SOP of the measurement beam is rotated so as to be efficiently reflected by the PBS 606 to the objective lens 614.

Example 6. Air Corner Cubes

Figure 7:
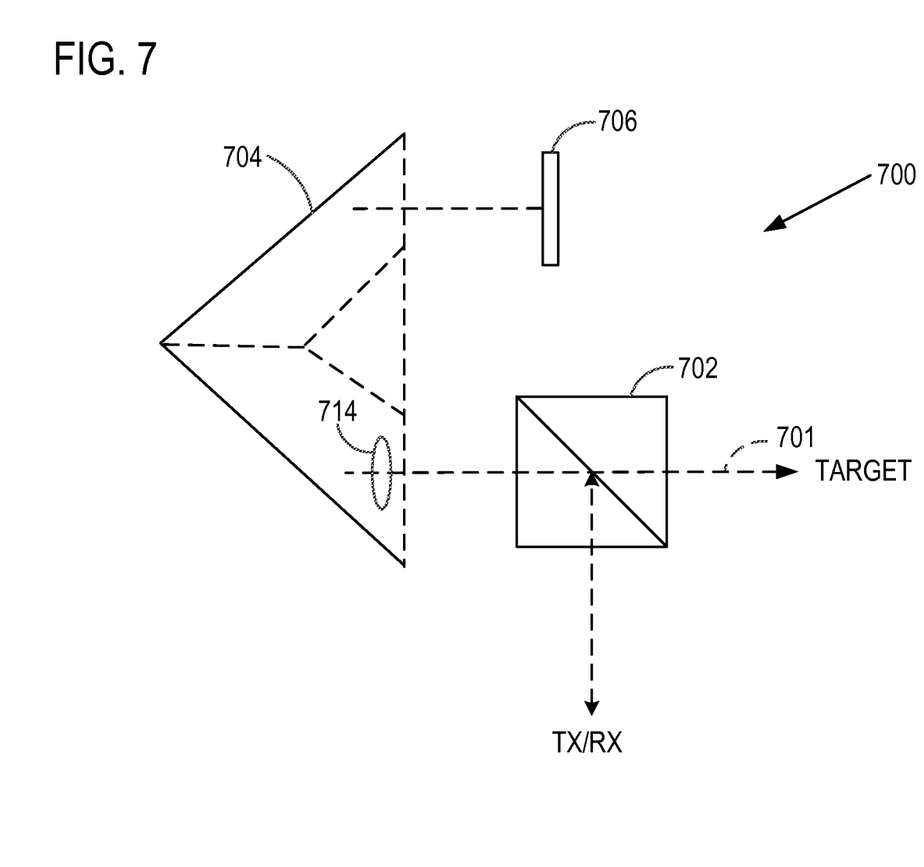
FIG. 7 illustrates an optical system that includes an air corner cube.

While a corner cube provides a number of advantages, other optical elements including other prims types such as right angle prisms or roof prisms can be used. Such prisms can be solid optical elements formed of various optical materials such as glasses or fused silica with entrance, exit, and reflective surfaces defined by index of refraction differences. In other examples, reflective surfaces defined by reflective coatings such as metallic or dielectric coatings can be air spaced to form, for example, so called air corner cubes, or other air spaced prisms. Such air prisms typically have less mass, but are less robust than solid prisms. FIG. 7 illustrates an air spaced corner cube 704 ("air corner cube") situated to receive a measurement beam from a PBS 702 along an axis 701. A return reflector 706 is situated to direct a received measurement beam back to the PBS 702 and to a target. A relay lens 714 can be situated within the air corner cube 704 or at other locations.

Example 7. Representative Laser Radar Systems

Figure 8:
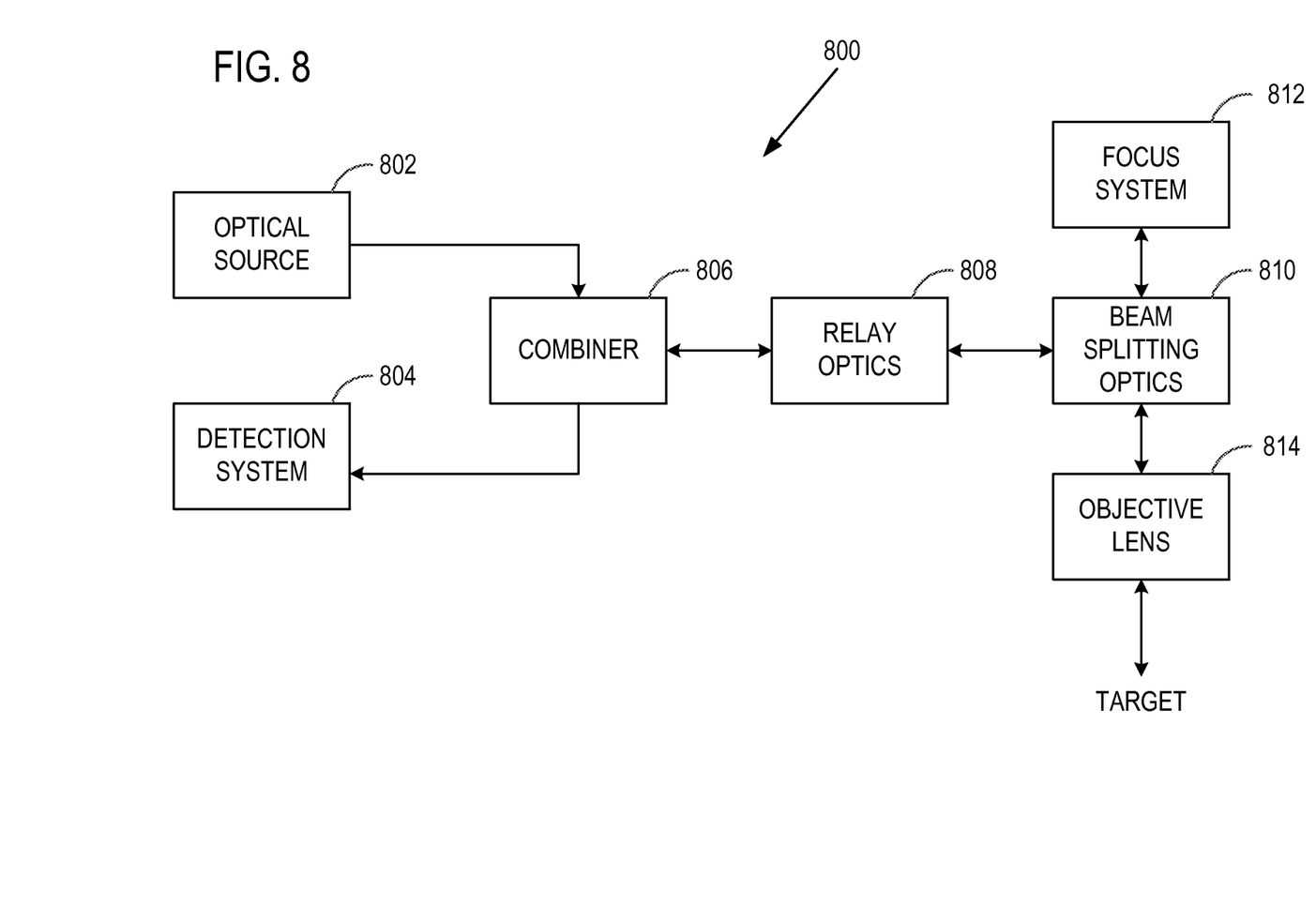
FIG. 8 is a block diagram of a laser radar having a relay optical system.

With reference to FIG. 8, a laser radar 800 includes an optical source 802 such as one or more laser diodes that direct corresponding input optical beams to a combiner 806. A relay optical system 808 is configured to converge or focus and direct the converged optical beams to a beam splitting system 810 that directs the optical beam to focus adjustment system 812. The focus adjustment system returns the optical beam to the beam splitting optical system and an objective lens system 814. The relay optical system typically converges the optical beam to a focus in a return path in or after exiting the focus system 812. A return beam from a target is directed back to a detection system 804 so that a detected beam portion can be used to estimate a target distance. The detection system can determine target distance based on time of flight to a target, or a difference frequency obtained by mixing the return beam with a local oscillator (LO) beam to produce a heterodyne signal. In some examples, the input optical beam and the LO beam are chirped, and a heterodyne signal frequency corresponds to a target distance.

Representative Manufacturing Methods and Apparatus

Figure 9:
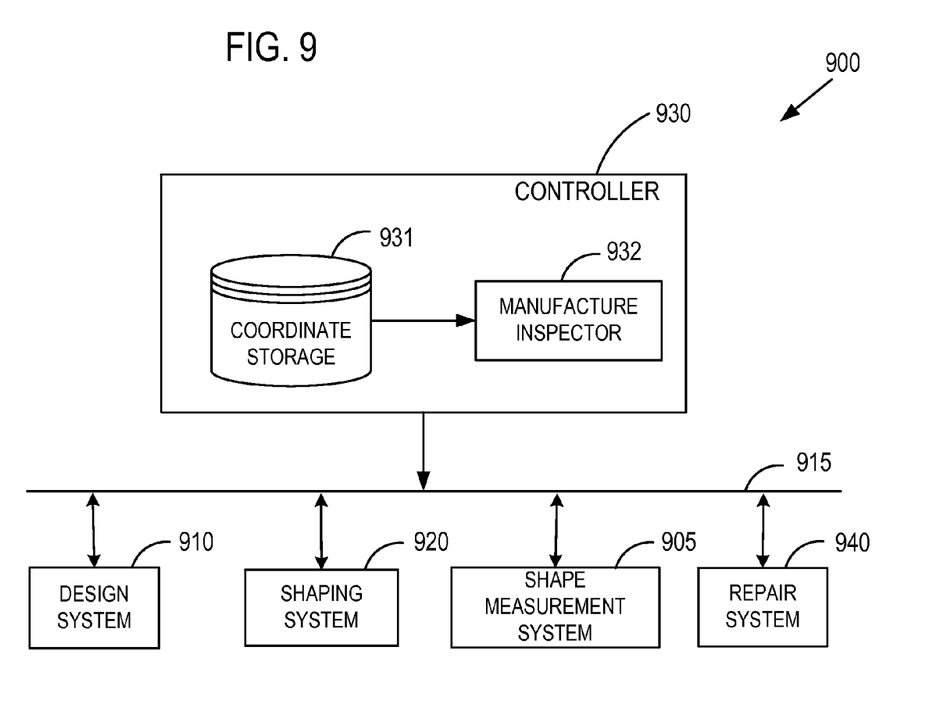
FIG. 9 is a block diagram of a representative manufacturing system that includes a laser radar or other profile measurement system to manufacture components, and assess whether manufactured parts are defective or acceptable.

Any of the examples above can be included in manufacturing. FIG. 9 illustrates a representative manufacturing system 900 suitable for producing one or more components of a ship, airplane, or part of other systems or apparatus, and for evaluating and reprocessing such manufactured components. The system 900 typically includes a shape or profile measurement system 905 such as the laser radar discussed above. The manufacturing system 900 also includes a design system 910, a shaping system 920, a controller 930, and a repair system 940. The controller 930 includes coordinate storage 931 configured to store measured and design coordinates or other characteristics of one or more manufactured structures as designed and/or measured. The coordinate storage 931 is generally a computer readable medium such as hard disk, random access memory, or other memory device. Typically, the design system 910, the shaping system 920, the shape measurement system 905, and a repair system 940 communicate via a communication bus 915 using a network protocol.

The design system 910 is configured to create design information corresponding to shape, coordinates, dimensions, or other features of a structure to be manufactured, and to communicate the created design information to the shaping system 920. In addition, the design system 910 can communicate design information to the coordinate storage 931 of the controller 930 for storage. Design information typically includes information indicating the coordinates of some or all features of a structure to be produced.

The shaping system 920 is configured to produce a structure based on the design information provided by the design system 910. The shaping processes provided by the shaping system 920 can include casting, forging, cutting, or other process. The shape measurement system 905 is configured to measure the coordinates of one or more features of the manufactured structure and communicate the information indicating measured coordinates or other information related to structure shape to the controller 930.

A manufacture inspector 932 of the controller 930 is configured to obtain design information from the coordinate storage 931, and compare information such as coordinates or other shape information received from a profile measuring apparatus that include focus assemblies as illustrated in FIGS. 1-2 with design information read out from the coordinate storage 931. The manufacture inspector 932 is generally provided as a processor and a series of computer-executable instructions that are stored in a tangible computer readable medium such as random access memory, a flash drive, a hard disk, or other physical devices. Based on the comparison of design and actual structure data, the manufacture inspector 932 can determine whether or not the manufacture structure is shaped in accordance with the design information, generally based on one or more design tolerances that can also be stored in the coordinate storage 931. In other words, the manufacture inspector 932 can determine whether or not the manufactured structure is defective or nondefective. When the structure is not shaped in accordance with the design information (and is defective), then the manufacture inspector 932 determines whether or not the structure is repairable. If repairable, then the manufacture inspector 932 can identify defective portions of the manufactured structure, and provide suitable coordinates or other repair data. The manufacture inspector 932 is configured to produce one or more repair instructions or repair data and forward repair instructions and repair data to the repair system 940. Such repair data can include locations requiring repair, the extent of re-shaping required, or other repair data. The repair system 940 is configured to process defective portions of the manufactured structure based on the repair data.

Figure 10:
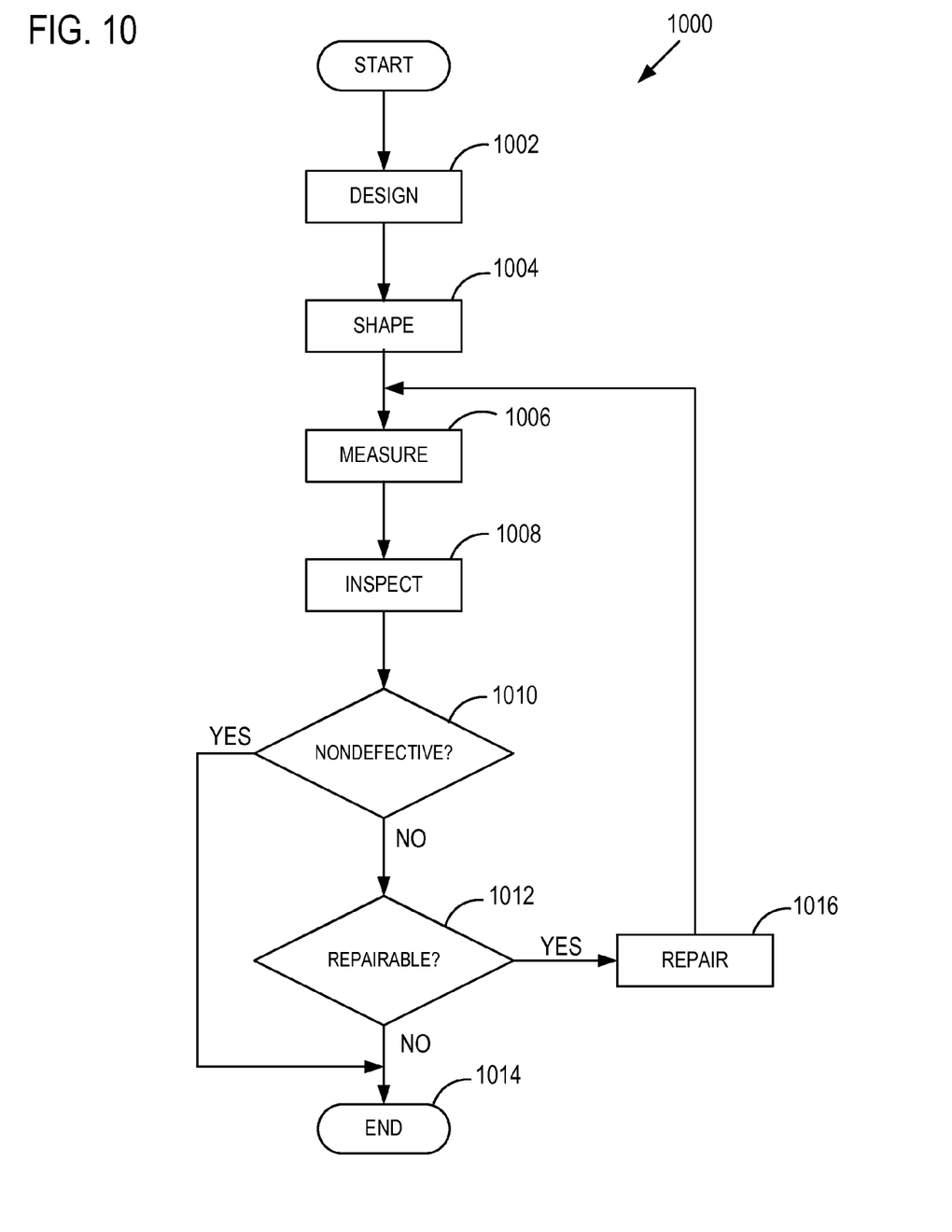
FIG. 10 is a block diagram illustrating a representative manufacturing method that includes profile measurement to determine whether manufactured structures or components are acceptable, and if one or more such manufactured structures can be repaired.

FIG. 10 is a flowchart showing a representative manufacture method 1000 that can incorporate manufacturing systems such as illustrated in FIG. 9. At 1002, design information is obtained or created corresponding to a shape of a structure to be manufactured. At 1004, the structure is manufactured or "shaped" based on the design information. At 1006, coordinates, dimensions, or other features of the manufactured structure are measured with a profile measurement system such as the laser radar systems described above to obtain shape information corresponding to the structure as manufactured. Typically, profile measurement is accomplished with a fine scan and a coarse scan of a laser beam. At 1008, the manufactured structure is inspected based on a comparison of actual and design dimensions, coordinates, manufacturing tolerance, or other structure parameters. At 1010, if the manufactured structure is determined to be nondefective, the manufactured part is accepted and processing ends at 1014. If the manufactured part is determined to be defective at 1010 by, for example, the manufacture inspector 932 of the controller 930 as shown in FIG. 9, then at 1012 it can be determined whether the manufacture part is repairable. If repairable, the manufactured part is reprocess or repaired at 1016, and then measured, inspected, and reevaluated at 1006, 1008, 1010, respectively. If the manufactured part is determined to be unrepairable at 1012, the process ends at 1014.

According to the method of FIG. 10, using a profile measurement system to accurately measure or assess coordinates or other features of a manufactured structure, a manufactured structure can be evaluated to determine if the structure is defective or nondefective. Further, if a manufactured structure is determined to be defective, a reprocessing process can be initiated if the part is deemed to be repairable based on design and actual structure dimensions and features. By repeating the measurement, inspection, and evaluation processes, defective parts can be reprocessed, and parts that are defective but that are not repairable can be discarded. The particular systems and methods of FIGS. 9-10 are exemplary only, and other arrangements can be used.

In the above embodiment, the structure manufacturing system 900 can include a profile measuring system such as the laser radar and laser tracking systems disclosed above, the design system 910, the shaping system 920, the controller 930 that is configured to determine whether or not a part is acceptable (inspection apparatus), and the repair system 940. However, other systems and methods can be used and examples of FIGS. 9 and 10 are provided for convenient illustration.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. An optical system, comprising:
   a focus relay optical system configured to direct a measurement light flux propagating along an axis toward a focus along the axis;
   an objective lens system; and
   a focus adjustment system that receives the measurement light flux from the focus relay optical system and directs the measurement light flux to the objective lens system, wherein the focus adjustment system includes at least one optical element that is moveable along the axis; and
   wherein the focus adjustment system is configured so that a propagation distance of the measurement light flux between the focus relay optical system and the objective lens system along the axis is variable so that the focus relay optical system and the objective lens system adjust the focus along the axis so that the focus is moveable along the axis.

2. The optical system of claim 1, wherein the focus relay optical system is configured to direct the measurement light flux propagating along the axis so that the focus is within the focus adjustment system.

3. The optical system of claim 1, wherein the focus adjustment system includes a corner cube translatable along the axis and a return reflector, wherein the focus relay optical system is configured to direct the measurement light flux propagating along the axis so that the focus is within the corner cube.

4. The optical system of claim 1, wherein the focus adjustment system includes a corner cube translatable along the axis and a return reflector, wherein the focus relay optical system is configured to direct the measurement light flux propagating along the axis so that the focus is between the corner cube and the return reflector.

5. The optical system of claim 1, wherein the relay optical system is configured to establish the focus along the axis on a target-side portion of the optical path in the corner cube associated with propagation of the measurement beam from the return reflector.

6. The optical system of claim 1, wherein the focus is at a free space portion of the optical path.

7. The optical system of claim 1, wherein the focus is situated between the objective lens system and the beam splitting system.

8. The optical system of claim 1, further comprising a beam splitting system configured to direct at least a portion of the measurement light flux to the focus adjustment system and at least a portion of the measurement light flux from the focus adjustment system to the objective lens system.

9. The optical system of claim 8, wherein the focus adjustment system includes a corner cube and a return reflector, wherein the corner cube is translatable along the axis.

10. The optical system of claim 9, wherein the beam splitting system includes a polarizing beam splitter (PBS) and at least one wave plate situated so that the measurement light flux in a first state of polarization is delivered to the PBS and received by the PBS from the focus assembly in a second state of polarization that is orthogonal to the first state of polarization.

11. The optical system of claim 10, wherein the at least one wave plate is a ¼ wave retarder.

12. The optical system of claim 11, where the at least one wave plate is situated along the axis between the PBS and the corner cube.

13. The optical system of claim 11, where the at least one wave plate is situated along the axis between the return reflector and the corner cube.

14. The optical system of claim 10, wherein the at least one wave plate includes a first wave plate situated between the PBS and the corner cube along the axis, and a second wave plate situated along the axis between the corner cube and the return reflector.

15. The optical system of claim 10, wherein the PBS is configured to reflect the measurement light flux to the corner cube.

16. The optical system of claim 10, wherein the PBS is configured to transmit the measurement light flux to the corner cube.

17. The optical system of claim 10, wherein the focus relay optical system includes at least one lens situated to direct the measurement flux into the PBS.

18. The optical system of claim 10, wherein the focus relay optical system includes at least one lens situated to receive the measurement flux from the PBS and converge the measurement flux into the focus adjustment optical system.

19. The optical system of claim 9, wherein the focus relay optical system includes a lens situated along the axis between the corner cube and the return reflector.

20. The optical system of claim 9, wherein the return reflector is convex or concave.

21. A distance measuring apparatus, comprising:
    the optical system of claim 1;
    a detector situated to receive a portion of the measurement light flux that is reflected by the target; and
    a controller configured to measure a distance to the target based on the received portion of the measurement light flux.

22. A laser system, comprising:
    an optical fiber coupled to the at least one laser and configured to emit a measurement beam from the laser along an axis;
    a focus relay optical system configured to receive the measurement beam from the optical fiber and direct the measurement beam to a first focus along the axis;
    a focusing assembly that includes at least one moveable optical element, the focusing assembly configured to receive the measurement beam from the focus relay optical system; and
    an objective lens situated so as to receive the measurement beam from the focusing assembly and direct a focused measurement beam to a target with a second focus along the axis.

23. The laser system of claim 22, further comprising a beam splitting optical assembly, wherein the focus relay optical system is situated to direct the measurement beam to the beam splitting optical system.

24. The laser system of claim 22, further comprising a beam splitting optical assembly, wherein the focus relay optical system is situated to receive the measurement beam from the beam splitting optical system.

25. The laser system of claim 22, wherein the focus relay optical system is configured to converge the measurement beam.

26. The laser system of claim 22, wherein the focus relay optical system is configured to focus the measurement beam within the focusing assembly.

27. The laser system of claim 26, wherein the focus relay optical system is configured to focus the measurement beam along a target-side portion of a variable optical path of the measurement beam along the axis that varies based on a movement of the moveable optical element.

28. The laser radar system of claim 22, further comprising a detection system configured to receive the measurement beam from the target with the optical fiber and produce an estimate of a target distance.

29. The system of claim 22, wherein the at least one moveable optical element of the focusing assembly includes a retroreflector and the focusing assembly includes a return reflector, wherein the movement of the retroreflector is configured to establish a variable optical path of the measurement beam along the axis.

30. The system of claim 29, wherein the return reflector is fixed.

31. The system of claim 29, wherein the return reflector is fixed and the retroreflector is a corner cube.

32. The system of claim 29, wherein:
the retroflector is a corner cube;
the optical fiber is a polarization retaining optical fiber configured to emit the measurement beam in a first state of polarization (SOP);
and further comprising a beam splitting optical assembly that includes a polarizing beam splitter (PBS) and at least one wave plate situated along the axis and configured to substantially communicate the measurement beam in the first SOP to the focusing assembly and communicate the measurement beam from the focusing assembly to the PBS in a second SOP that is orthogonal to the first SOP.

33. The system of claim 32, wherein the PBS is configured to communicate the measurement beam to the focusing assembly by transmitting the measurement beam.

34. The system of claim 32 wherein the PBS is configured to communicate the measurement beam to the focusing assembly by reflecting the measurement beam.

35. The system of claim 32, wherein the at least one wave plate is a quarter wave plate or two waveplates that provide a total of ¼ retardation.

* * * * *